US009454925B1

(12) United States Patent
Grafton et al.

(10) Patent No.: US 9,454,925 B1
(45) Date of Patent: Sep. 27, 2016

(54) IMAGE DEGRADATION REDUCTION

(71) Applicant: GOOGLE INC., Mountain View, CA (US)

(72) Inventors: James Grafton, London (GB); James Kent, Banstead (GB)

(73) Assignee: Google Inc., Mountain View, CA (US)

(*) Notice: Subject to any disclaimer, the term of this patent is extended or adjusted under 35 U.S.C. 154(b) by 107 days.

(21) Appl. No.: 14/482,299

(22) Filed: Sep. 10, 2014

(51) Int. Cl.
*G06F 3/0484* (2013.01)
*G09G 3/20* (2006.01)

(52) U.S. Cl.
CPC .... *G09G 3/2007* (2013.01); *G09G 2320/0257* (2013.01); *G09G 2320/0295* (2013.01); *G09G 2320/106* (2013.01); *G09G 2360/16* (2013.01)

(58) Field of Classification Search
USPC .......................................................... 345/694
See application file for complete search history.

(56) References Cited

U.S. PATENT DOCUMENTS 6,661,470 B1 * 12/2003 Kawakami ........... G09G 3/2022 345/474
7,750,897 B2 * 7/2010 Nishi .................... G06T 7/0083 345/204
8,115,708 B2 2/2012 Hatalkar
8,194,189 B2 6/2012 Chan et al.
8,356,319 B2 1/2013 Fernandez et al.
2007/0236410 A1 10/2007 Shimizu
2010/0123651 A1 * 5/2010 Miller .................. G09G 3/3208 345/77
2013/0178304 A1 * 7/2013 Chan ...................... A63B 69/36 473/266
2015/0130860 A1 * 5/2015 Park ..................... G09G 3/3225 345/691

FOREIGN PATENT DOCUMENTS

EP 1772849 B1 8/2012
TR EP 1772849 A1 * 4/2007 ............... G09G 5/00

* cited by examiner

*Primary Examiner* — Jason Olson
*Assistant Examiner* — Deeprose Subedi
(74) *Attorney, Agent, or Firm* — Brake Hughes Bellermann LLP

(57) ABSTRACT

According to an aspect, an image degradation prevention module for reducing image degradation includes a screen region monitor configured to derive light information for each of a plurality of regions of a display screen, an element movement detector configured to derive element motion information for a plurality of display elements displayed in the plurality of regions, and a decision engine configured to select a corrective action among a plurality of corrective actions for at least one display element of the plurality of display elements to reduce image degradation based on the light information and the element motion information. The light information may include light intensity information indicating a rate of change in light intensity of pixels within each region. The element motion information may include a rate of movement for each display element within the display screen.

20 Claims, 4 Drawing Sheets

IMAGE DEGRADATION REDUCTION

BACKGROUND

Despite advancements in screen technology, screen burn-in (including image persistence) can be a problem on display screens. In one example, after a stationary (or semi-stationary) image is displayed on a display screen and a partial or full screen re-draw occurs, the previous image may persist on the display screen. The cause of screen burn-in may vary depending on the type of display screen. For instance, liquid crystals have a natural relaxed state. When a voltage is applied, the liquid crystals may be re-arranged to block certain light waves. If the same voltage is applied for an extended period of time, the liquid crystals tend to stay in that position. Image persistence may visibly occur when the pixels are used in inconsistence amounts (e.g. a top left pixel is less likely to be changing as the pixel in the middle of the screen). In some cases, television and display monitor manufacturers carefully limit their liability for these problems in their warranties.

In some conventional approaches, screen savers are recommended to avoid potential screen burn-in. However, screen savers are typically activated after an extended idle time and may not be appropriate in certain types of environments such as kiosks, display signs or panels, billboards, etc. Also, screen savers may distract from viewing information that would otherwise be displayed on the display screen. In other conventional approaches to screen-burn-in, software is provided that performs a white wipe (e.g., a specialized screen saver) that changes pixels on the display screen to completely white.

SUMMARY

The details of one or more implementations are set forth in the accompanying drawings and the description below. Other features will be apparent from the description and drawings, and from the claims.

According to an aspect, an image degradation prevention module for reducing image degradation includes a screen region monitor configured to derive light information for each of a plurality of regions of a display screen, an element movement detector configured to derive element motion information for a plurality of display elements displayed in the plurality of regions, and a decision engine configured to select a corrective action among a plurality of corrective actions for at least one display element of the plurality of display elements to reduce image degradation based on the light information and the element motion information. The light information may include light intensity information indicating a rate of change in light intensity of pixels within each region. The element motion information may include a rate of movement for each display element within the display screen.

The embodiments may include one or more of the following features (or any combination thereof). The screen region monitor may be configured to detect the rate of change in the light intensity of pixels by recursively subdividing the display screen into the plurality of regions and determining a change of luminance of the pixels within each region over time. The element movement detector may be configured to detect the display elements within the regions, and track the movement of the detected display elements over time. The image degradation prevention module may include an event collector configured to derive event information for draw or redraw events related to the display elements rendered from at least one application, and the decision engine may be configured to select the corrective action based on the event information, the light information, and the element motion information. The decision engine may be configured to determine an impact of potential image degradation caused by each display element based on an evaluation of the light information and the element motion information. The decision engine may be configured to select the at least one display element as a candidate for causing image degradation based on the determined impact meeting a threshold level. The decision engine may include a score calculator configured to calculate a score for each display element based on an evaluation of the light information and the element motion information. The score may indicate a likelihood of a respective display element causing image degradation. The decision may include an action decider configured to select the at least one display element as a candidate for causing image degradation based on the calculated score meeting a threshold level, and the action decider may be configured to select the corrective action among the plurality of corrective actions for the at least one display element based the calculated score for the at least one display element. The score calculator may calculate the score for each display element according to a scoring algorithm that includes weights applied to the rate of change in the light intensity of pixels for one or more regions that displays a respective display element and the rate of movement for each display element within the display screen. The decision engine may include an updater configured to update previous corrective action information with the selected corrective action and result information indicating whether the selective corrective action was effective or ineffective for reducing image degradation, and the decision engine may be configured to select a subsequent corrective action based on an examination of the previous corrective action information.

According to an aspect, a non-transitory computer-readable medium storing executable instructions that when executed by at least one processor are configured to derive light information for each of a plurality of regions of a display screen, derive element motion information for a plurality of display elements displayed in the plurality of regions, determine an impact of potential image degradation caused by each display element based on an evaluation of the light information and the element motion information, select a corrective action among a plurality of corrective actions for at least one display element of the plurality of display elements based on the impact of potential image degradation caused by each display element, apply the corrective action to the at least one display element, and update the evaluation of the light information and the element motion information based on a result of the applied corrective action.

The embodiments may include one or more of the following features (or any combination thereof). The executable instructions to derive light information may include executable instructions to detect the rate of change in the light intensity of pixels by recursively subdividing the display screen into the plurality of regions and determine a change of luminance of the pixels within each region over time. The executable instructions to derive light information may include executable instructions to derive light wavelength information indicating transitions in wavelengths over time. The executable instructions cause the at least one processor to derive event information for at least one user event that caused a rendering of the at least one display element and select the corrective action based on the event information, the light information, and the element motion information. The executable instructions to determine the impact of potential image degradation caused by each display element may include executable instructions to calculate a score for each display element based on a scoring algorithm that applies weights to metrics of the light information and the element motion information. The selected corrective action may indicate to change a luminance of the at least one display object or change a position of the at least one display object.

According to an aspect, a method for reducing display screen burn-in, the method being performed by at least one processor, may include selecting a first corrective action among a plurality of corrective actions for at least one display element displayed on a display screen according to decision-making criteria, applying the first corrective action to reduce potential image degradation caused by the at least one display element, updating the decision-making criteria with a result of the first corrective action, selecting a second corrective action among the plurality of corrective actions for the at least one display element according to the updated decision-making criteria, and applying the second corrective action to reduce the potential image degradation caused by the at least one display element.

The embodiments may include one or more of the following features (or any combination thereof). The selecting the first corrective action may include calculating a score indicating an impact of causing potential image degradation by the at least one display element by evaluating transitions in light intensity and wavelength over time and transitions in movement over time for the at least one display element, and selecting the first corrective action based on the score. The selecting the first corrective action may include calculating a score according to a scoring algorithm that receives transitions in light intensity and wavelength over time and transitions in movement over time for the at least one display element and selecting the first corrective action based on the score, where the updating the decision-making criteria includes changing the scoring algorithm based on the results of the first corrective action. The method may include deriving luminance and movement history of the at least one display object, where the first corrective action is selected based on an evaluation of the luminance and movement history within the decision-making criteria. The first corrective action may indicate to change a luminance of the at least one display object, and the second corrective action may indicate to change a position of the at least one display object. The method may include collecting information regarding a display of the at least one display element that has been rendered by Open Graphics Library (open GL) or other display technologies in response to a user request, where the first corrective action is selected based on an evaluation of the collected information within the decision-making criteria.

DETAILED DESCRIPTION

Figure 1:
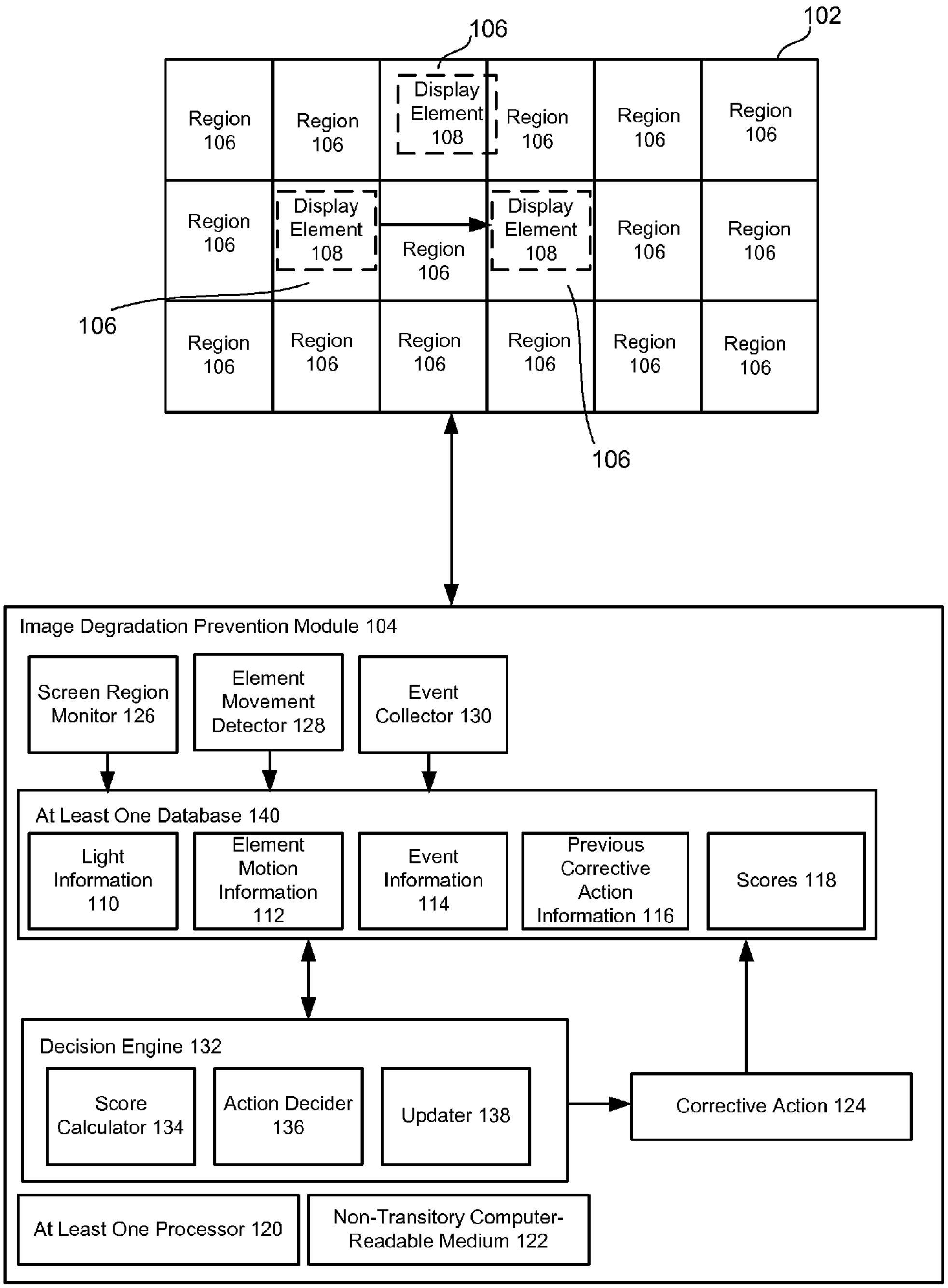
FIG. 1 illustrates an image degradation prevention module for reducing potential screen burn-in on a display screen according to an aspect.

FIG. 1 illustrates an image degradation prevention module 104 for reducing image degradation on a display screen 102 according to an aspect. The display screen 102 may be any type of output device that presents information in visual form. The display screen 102 may include cathode ray tube (CRT), plasma, liquid crystal display (LCD), light-emitting diode (LED), or organic light-emitting diode (OLED) technologies. Image degradation may include screen burn-in that is a permanent or temporary discoloration of areas on the display screen 102. Also, the term image degradation may encompass image persistence or image retention (e.g., sometimes referred to as screen burn-in), which a previously displayed image may persist on the display screen 102.

The image degradation prevention module 104 may be configured to implement a self-improving image degradation prevention algorithm that evaluates different regions 106 for image degradation (or screen burn-in) and which display elements 108 would be effected by the different regions 106 of image degradation, and selects a corrective action 124 among a plurality of corrective actions to reduce potential image degradation based on an outcome of the evaluation. For example, according to the self-improving image degradation prevention algorithm, the image degradation prevention module 104 may determine an impact of potential image degradation caused by each display element 108 rendered on various regions 106 of the display screen 102. The impact of image degradation may refer to a degree in which a corresponding display element 108 may potentially cause screen burn-in or image persistence (e.g., a higher determined impact may indicate that the corresponding display object 108 has an increased chance of causing image degradation). Stated another way, the impact of potential image degradation may refer to the level, relevance, degree, or importance the corresponding display object 108 has in causing potential screen burn-in or image persistence on the display screen 102.

In some examples, the image degradation prevention module 104 may derive or otherwise obtain luminance and movement history associated with each display element 108 from at least one database 140, and may determine the impact of potential image degradation based on the luminance and movement history such that the determined impact influences which display elements 108 are selected as candidates for causing potential image degradation and which corrective action 124 is selected for the at-risk display elements 108. For instance, the luminance and movement history may indicate how long each display element 108 has been stationary in terms of movement and luminance. In some examples, the image degradation prevention module 104 may evaluate transitions in light intensity (and/or wavelength thus encapsulating color) over time and transitions in display element movements over time in order to determine a relative impact of causing potential image degradation, and dynamically select an effective corrective action 124 to be applied to one or more display elements 108 that are at risk for causing image degradation on their corresponding regions 106.

Furthermore, the image degradation prevention module 104 may obtain the results of the selected corrective action 124 from the at least one database 140, and the image degradation prevention module 104 may use the results of the selected corrective action 124 to update the decision-making criteria for selecting future corrective actions. The results may indicate whether previously applied corrective actions were effective or ineffective for reducing image degradation. For example, the image degradation prevention module 104 may continue to collect and store luminance and movement information for the at-risk display element 108 after applying the corrective action 124, and this information may be used to determine whether its impact of potential image degradation has increased, decreased, or remained substantially the same. If the impact of potential image degradation has decreased (or decreased by a threshold amount), the image degradation prevention module 104 may determine that the previously selected corrective action 124 was effective. If the impact of potential image degradation has increased, increased by a threshold amount, or remained the same, the image degradation prevention module 104 may determine that the previously selected corrective action 124 was ineffective. In some examples, the evaluation on how the impact is determined for each display element 108 may be updated based on the results of previously applied corrective actions. As such, the self-improving image degradation prevention algorithm may evolve based on the corrective actions previously taken. Also, the self-improving image degradation prevention algorithm may evolve as further knowledge is gained regarding the history state of the display elements 108.

In some examples, the self-improving image degradation prevention algorithm implemented by the image degradation prevention module 104 may decrease costs associated with purchasing new products to replace burnt-in display monitors, increase efficiency for users (e.g., minimize or eliminate screen savers that distract the displaying of underlying information), and/or increase exposure time on large or outdoor video displays (e.g., increased efficiency of display advertising). In some examples, the self-improving image degradation prevention algorithm may provide a more intelligent, automatic, and focused approach by determining which display elements 108 to adapt or change and which display elements 108 to leave alone in a manner that allows applications to interface with the display screen 102 without the content-rendering applications having any knowledge of these techniques. Also, the display elements 108 may be displayed in a manner that is relatively more in tune with the intention of the user or the application while reducing potential image degradation.

Each region 106 may refer to a portion, area, or section of the display screen 102. In some examples, the regions 106 are rectangular or square. In other examples, the regions 106 have a non-rectangular or non-square shape. The display screen 102 may be divided into any number of regions 106. Each region 106 may represent one or more pixels of the display screen 102. For example, each region 106 may refer to an individual pixel or a group of pixels. The display screen 102 may render imagery in the form of display elements 108 in various regions 106 of the display screen 102. Generally, the display elements 108 may refer to objects, images, or shapes of imagery rendered on the display screen 102. In some examples, the display elements 108 may be windows, tabs, objects such as rectangles or other non-rectangular objects, images, and/or user interface elements or objects. One or more of the display elements 108 may be at-risk for causing a temporary or permanent degradation of area(s) on the display screen 102. Some examples includes a degradation of image quality, a temporary or permanent ghost-like image of the display elements, discolorations on one or more areas of the display screen 102, color drifts (e.g., where one or more colors becomes more prominent), transient image persistence caused by charge build-up in pixel cells, among others. Again, image degradation may refer to screen burn-in and/or image persistence. The exact cause for the creation of image degradation may vary depending on the type of display technology. In some examples, when a particular display element 108 is displayed on the display screen 102 for a relatively long period of time, one or more areas of the display screen 102 may be degraded (in some cases, damaged) leaving discolorations that could be temporary or permanent.

In order to evaluate which display elements 108 are at risk for causing potential image degradation, the image degradation prevention module 104 may obtain one or more of the following information from the at least one database 140: light information 110, element motion information 112, and event information 114. In some examples, the image degradation prevention module 104 obtains the light information 110 and the element motion information 112. In other examples, the image degradation prevention module 104 obtains the light information 110, the element motion information 112, and the event information 114.

The light information 110 may include light intensity information providing detected transitions of light intensity over time for each of the regions 106. For example, the light information 110 may reflect the luminance history of the pixels within the regions 106 including when and how often the luminance changes over time. Also, the light information 110 may include wavelength transition information providing transitions of the wavelengths applied to the regions 106, which may encapsulate when and how often color changes.

The image degradation prevention module 104 may include a screen region monitor 126 configured to derive the light information 110 using any type of integrated hardware analysis on the various pixels of the regions 106 of the display screen 102. For example, the screen region monitor 126 may track changes in light intensities (and/or wavelength transitions) within the regions 106 over time. As such, the light information 110 may indicate a rate of change in the light intensity of pixels within each region 106 within a period of time, and/or the rate of change in terms of wavelength transitions. In some examples, the rate of change in the light intensity (and/or wavelength transitions) may indicate a level of static-ness of the pixels within the region 106. In some examples, the rate of change in the light intensity may indicate a level of change (and/or lack of change) of the luminance (and/or wavelength) of the pixels within the region 106. Stated another way, the rate of change may indicate whether the luminance (and/or wavelengths) of the pixels within the region 106 has a relatively constant value over time.

The screen region monitor 126 may be configured to detect the rate of change in the light intensity of pixels within a time period by recursively subdividing the display screen 102 into a number of distinct regions 106, and determining a change of luminance of the pixels within each region 106 over time. For example, the display screen 102 may have any type of size ranging from relatively large display screen panels to relatively small display screens on mobile computing devices. In some examples, the size (e.g., width×height) of the display screen 102 may be expressed in units of pixels (e.g., 1024×768). The screen region monitor 126 may periodically detect the luminance of the pixels within each region 106 over time, and then determine the rate of change in light intensity by examining the luminance at each of the iterations. As such, it may be determined whether the luminance for each region 106 remained relatively the same over time which may factor into whether the display elements 108 provided on these regions 106 are more susceptible to potential image degradation.

In a further example, at a first point in time, the screen region monitor 126 may divide the display screen 102 into smaller distinct regions 106. In some examples, the size of each region 106 may be the same. In other examples, the size of some regions 106 may be larger than the size of other regions 106. Each region 106 may be associated with a particular portion of the display screen 102. Then, the screen region monitor 126 may detect the luminance of the pixel(s) within each region 106. In some examples, a luminance value may be associated with each pixel, and if a region 106 includes multiple pixels, the image degradation prevention module 104 may determine the average luminance of the pixels within the region 106.

At a second point in time, the screen region monitor 126 may divide the display screen 102 into the same regions 106, and then detect the luminance of the pixels within each region 106. Then, with respect to a particular region 106, the screen region monitor 126 may determine the rate of change in light intensity by examining the luminance at the first point in time for the region 106 with the luminance for the region 106 at the second point in time. In some examples, the screen region monitor 126 may determine the rate of change in light intensity after performing more than two iterations. Also, the screen region monitor 126 may be configured to obtain the wavelength transition information providing transitions of wavelengths over time in the same or similar manner as described above (and below) with respect to the light intensity of pixels.

The image degradation prevention module 104 may be configured to obtain the element motion information 112 from the at least one database 140. The element motion information 112 may include movement history associated with the display elements 108. For example, the element motion information 112 may provide transitions of the display elements 108 to various positions on the display screen 102 over time. In particular, the image degradation prevention module 104 may be configured to detect the shapes and positions of the display elements 108, and then determine their movements within the display screen 102 over time.

The image degradation prevention module 104 may include an element movement detector 128 configured to derive the element motion information 112. For example, the element movement detector 128 may be configured to detect the display elements 108 rendered within the regions 106 of the display screen 102 using any type of object detection technique on the display elements 108. In some examples, the element movement detector 128 may detect the shapes and positions of the display elements 108 based on corner-point detection. Then, the element movement detector 128 may track the movements of the detected display elements 108 over time to create the element motion information 112.

The element motion information 112 may indicate a rate of movement of each display element 108 within the display screen 102 within a period of time. In some examples, the rate of movement may indicate a level of static-ness of the display element 108 in terms of movement within the period of time. In some examples, the rate of movement may indicate a degree of movement (or lack of movement) of the display element 108 within the display screen 102 over time. Stated another way, the rate of movement may indicate whether the display element 108 has remained in a same location on the display screen 102, whether the display element 108 has moved to another location (or multiple locations), and/or how often the display element 108 moves over time. Also, the element motion information 112 may provide an initial location of the display element 108 within the display screen 102, an amount of time which the display element 108 was stationary at the initial location, and, if the display element 108 has moved, a secondary location of the display element 108 within the display screen 102, as well as the amount of time which the display element 108 was stationary at the secondary location (and so forth if the display element 108 has moved to other locations). Further, the element motion information 112 may specify the direction(s) in which the display element 108 has moved.

If allowed or permitted by the user, the image degradation prevention module 104 may obtain the event information 114 from the at least one database 140 in order to supplement the element motion information 112 and the light information 110. The event information 114 may provide display information of the display elements 108 in response to user events that draws or re-draws the display elements 108 on the display screen 102. For example, the event information 114 may include information regarding the display of the display elements 108 that have been rendered by Open Graphics Library (open GL) or other display technologies based on individual user requests. In some examples, the event information 114 may include information similar to the element motion information 112 and/or the light information 110. In some examples, the event information 114 may include the size and/or shape of the display elements 108, which positions the display elements 108 are drawn, and/or pixel luminance information for the pixels within the respective regions 106 of the display screen 102.

The image degradation prevention module 104 may include an event collector 130 configured to derive the event information 114. In some examples, the event information 114 may be captured from application programming interface (API) attributes from an underlying source application. In a non-limiting example, a user may open (draw) a browser window, and the browser window may be displayed on the display screen 102. Then, the user may redraw the displayed window to a different part of the display screen 102. As such, if allowed, the event collector 130 may collect information related to the draw and re-draw events such as pixel value information, the positions on the display screen 102 which the display elements 108 are drawn, when the draw and re-draw events have occurred, and an amount of time the display elements 108 were displayed. It is noted that the user may opt out of the functionalities of the event collector 130 such that information related to the user events are not collected.

The event collector 130 may derive the event information 114 without having to perform an integrated hardware analysis since this type of information may reside in the software layer in the device rendering the display elements 108 for display. As such, the image degradation prevention module 104 can collect information from different levels of technology perspectives (e.g., the event information 114 from the software layer, and the information 110, 112 from the hardware layer). As a result, the determination of a relative impact or an effective corrective action 124 may be improved by the richness of information collected from the various levels. Furthermore, over time, the image degradation prevention module 104 obtains more information regarding the history of light intensity transitions, wavelength transitions, and transitions in display object movements, which, as a result, improves the accuracy of determining the appropriate impact of potential image degradation for the display elements 108, thereby increasing the chance that the more effective corrective action 124 will be selected.

The image degradation prevention module 104 may include a decision engine 132 configured to apply decision making-criteria in order to select the corrective action 124 among a plurality of corrective actions for one or more at-risk display element 108 to assist in reducing potential image degradation based on the information 110, 112, and/or 114. The decision making-criteria may reflect how the impact of potential image degradation caused by each display element 108 is determined in order to identify which display elements 108 are at-risk for causing potential image degradation, and how the corrective action 124 is selected. Then, after selecting the appropriate corrective action 124, the decision engine 132 may apply the selected corrective action 124.

In some examples, the decision engine 132 may identify one or more display elements 108 that are potential candidates for causing image degradation based on the information 110, 112, and/or 114. In some examples, for all the display elements 108 rendered on the display screen 102, the decision engine 132 may identify one or a subset of the display elements 108 that are at-risk for causing image degradation. In some examples, the decision engine 132 may determine an impact of each display element 108 for causing image degradation based on the information 110, 112, and/or 114, and then if the impact is relatively high for a particular display element 108, the decision engine 132 may determine that this display element 108 is a candidate to take corrective action 124.

In some examples, the decision engine 132 may include a score calculator 134 configured to compute a score 118 for each of the display elements 108 based on the information 110, 112, and/or 114. Each score 118 may indicate a degree of causing image degradation within one or more of the regions 106 (e.g., the higher the score, the more likely the potential for causing image degradation). In other words, the score 118 may indicate a likelihood of causing image degradation by a corresponding display element 108. In some examples, the score calculator 134 may compute the score 118 based on the display element's rate of change in the light intensity (and/or rate of wavelength transitions) of pixels over time from the light information 110, the display element's rate of movement from the element motion information 112, and/or the display element's event information 114. In some examples, the score calculator 134 may compute the score 118 using a weighted scoring algorithm that applies weights to the metrics from the information 110, 112, and 114. If the score 118 for a particular display element 108 is equal to or above a threshold value, the decision engine 132 may identify that display object 108 as a candidate for potentially causing image degradation such that a corrective action 124 may be taken with respect to that display element 108.

The decision engine 132 may include an action decider 136 configured to select the corrective action 124 among a plurality of corrective action based on the computed scores 118. Each of the plurality of corrective actions may refer to a different action to be applied in order to assist in reducing image degradation (e.g., change luminance of pixels within one or more display elements 108 or one or more regions 106, change the position of one or more display elements 108, deactivate one or more areas of the display screen 102, etc.). The action decider 136 may dynamically select the corrective action 124 among the plurality of corrective actions such that the selected corrective action 124 may be relatively more effective in reducing image degradation than other non-selected corrective actions.

In some examples, the scores 118 may provide a basis for the corrective action selection. For example, the action decider 136 may select a first corrective action if the score 118 for the display element 108 is equal to or above a first value, and may select a second corrective action different than the first corrective action if the score 118 for the display element 108 is equal to or above a second value (e.g., the second value being higher than the first value). For example, a score or a range of scores may be associated with a particular corrective action. As such, if the computed score 118 meets or falls within score(s) associated with a type of corrective action, the action decider 136 may select that corrective action to be applied the at-risk display element 108.

Also, in conjunction with the scores 118, the action decider 136 may select the corrective action 124 for the one or more at-risk display elements 108 by examining previous corrective action information 116 indicating which previously applied corrective actions were effective or ineffective for reducing potential screen burn-in. For example, in order to determine an effective corrective action 124 for one or more at-risk display elements 108 (e.g., having calculated scores 118 equal to or above a threshold value), the action decider 136 may consult the previous corrective action information 116 by examining which previous corrective actions were effective. For example, the previous corrective action information 116 may provide the corrective actions taken at previous times. In some examples, the previous corrective action information 116 may indicate which corrective actions were taken with respect to the display elements 108. Also, the previous corrective action information 116 may indicate the factors (e.g., the rate of change of light intensity, the rate of wavelength transitions, the rate of movement of the display elements 108, the event information 114, etc.) that caused the action decider 136 to previously select that particular corrective action. Further, the previous corrective action information 116 may indicate whether the previous corrective actions were effective for reducing image degradation. For example, the previous corrective action information 116 may include the information 110, 112, and/or 114 at subsequent times after the previous corrective action was applied, which may indicate whether the previous corrective action was effective (e.g., determining whether any of the described information has changed in a manner that would indicate that image degradation was reduced).

In some examples, the action decider 136 may determine if any previous corrective actions were taken with respect to the candidate display element 108. If so, in some examples, the action decider 136 may determine how long ago the previous corrective action was taken. Also, if a previous corrective action was taken with respect to the display element 108, the action decider 136 may select another corrective action if that previous corrective action was taken a relatively short time ago (e.g., less than a threshold time period). In other examples, the action decider 136 may examine the previous corrective actions for other display elements 108 having similar scores 118 to identify a previous corrective action that was effective under the similar conditions. Also, the action decider 136 may determine multiple corrective actions 124 to different (or same) display elements 108.

Then, the decision engine 132 may apply the selected corrective action 124. As indicated above, the determined corrective action 124 may include moving the display element 108 from a first displayed position to a second displayed position, or adjusting the luminance of one or more pixels within the display elements 108. In some examples, the decision engine 132 may update the previous corrective action information 116 and/or the decision-making criteria with the results of the applied corrective action 124.

The decision engine 132 may include an updater 138 configured to update the previous corrective action information 116 and/or the decision-making criteria with the results of the applied corrective action 124. The results may indicate whether the previously applied corrective action was effective or ineffective. In some examples, the updater 138 may update the previous corrective action information 116 with the selected corrective action 124, and the conditions or factors that caused the action decider 136 to select that particular corrective action 124. Also, in some examples, the updater 138 may update (or replace) the previous corrective action information 116 with information indicating whether the previous corrective action was effective or ineffective (e.g., determining whether any of the described information has changed in a manner that would indicate that image degradation was reduced such at the rates of luminance or movement has decreased, or determining whether the score 118 has increased or decreased).

Also, the updater 138 may adjust (e.g., modify) the decision selection criteria of the decision engine 132 based on the previous corrective action information 116 such that a different corrective action is selected that is considered relatively more effective. In some examples, the updater 138 may adjust how the impact of image degradation is determined. In some examples, the updater 138 may adjust the scoring algorithm (e.g., adjusting the weights) implemented by the score calculator 134 based on the previous corrective action information 116. As such, the dynamic evaluation and selection of corrective actions 124 may improve over time as the decision engine 132 learns more about what corrective actions 124 were effective or ineffective.

The image degradation prevention module 104 may include at least one processor 120, and a non-transitory computer-readable medium 122 storing executable instructions that when executed by the at least one processor 120 are configured to implement the image degradation prevention module 104 and the functionalities described herein. The non-transitory computer-readable medium 122 may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. The at least one processor 120 may include one or more computer processing units (CPUs) such as any type of general purpose computing circuitry or special purpose logic circuitry, e.g., an FPGA (field programmable gate array) or an ASIC (application specific integrated circuit). Also, the at least one processor 120 may include one or more processors coupled to a semiconductor substrate. Also, the image degradation prevention module 104 may include at least one database 140 configured to store the light information 110, the element motion information 112, the event information 114, the previous corrective action information 116, and the scores 118. The at least one database 140 may include one more database structures implemented on the non-transitory computer-readable medium 122.

Figure 2:
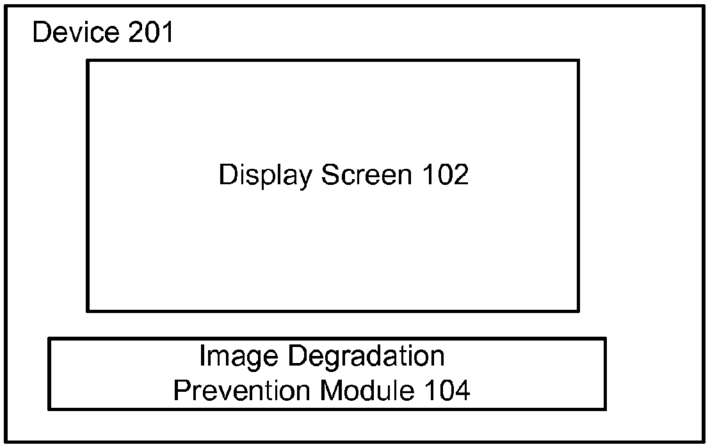
FIG. 2 illustrates an example implementation of the image degradation prevention module of FIG. 1 according to an aspect.

FIG. 2 illustrates an example implementation of the image degradation prevention module 104 according to an aspect. In some examples, the image degradation prevention module 104 may be implemented with a device 201. The device 201 may be one or more hardware components that display imagery on the display screen 102. In some examples, the device 201 may be a computing device such as a computer having a computer processing unit (CPU) and separate display monitor where the image degradation prevention module 104 may be incorporated into the CPU or the display monitor. In some examples, the device 201 may have the display screen 102 incorporated into the structure of the device 201 such as a laptop, smartphone, or tablet, for example. In other examples, the device 201 is a standalone display monitor or panel or television set.

Figure 3:
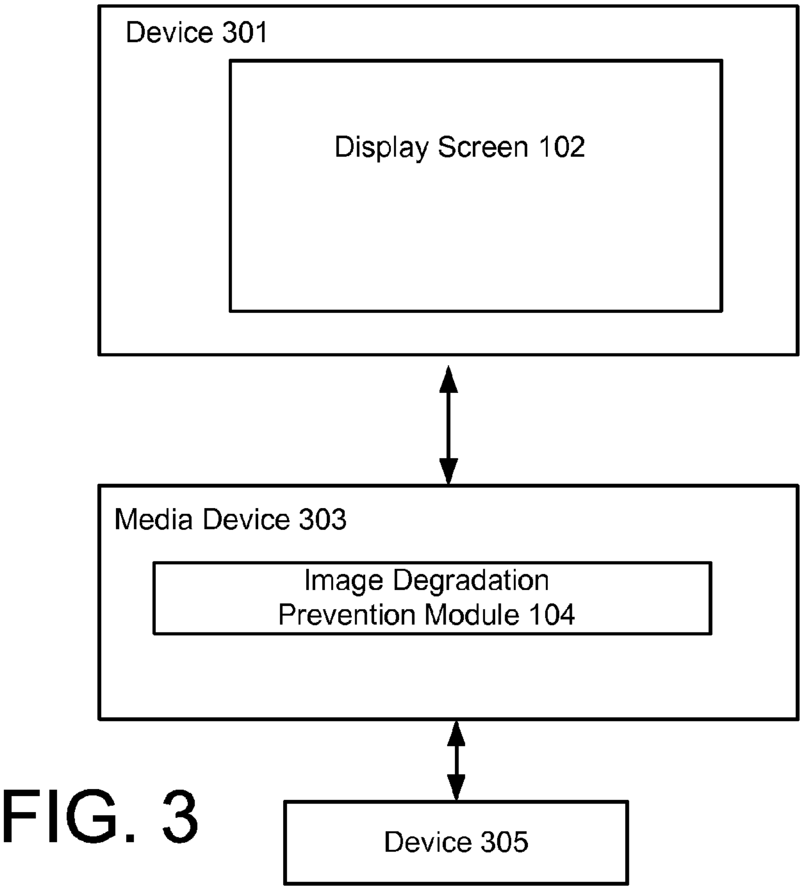
FIG. 3 illustrates an example implementation of the image degradation prevention module of FIG. 1 according to another aspect.

FIG. 3 illustrates an example implementation of the image degradation prevention module 104 according to another aspect. For example, the image degradation prevention module 104 may be implemented into a media device 303 coupled to a device 301 having the display screen 102. The device 301 may be any type of devices explained with reference to the device 201 of FIG. 2. The media device 303 may be any type of a streaming device or media device that can be coupled to the device 301 via any type of connection such as wired, wireless, or direct connection. Also, the media device 303 may be coupled to a device 305 via any type of connection such as wired, wireless, or direct connection. The device 305 may be any type of device that provides content to be displayed. In some examples, the device 305 may be a computer (personal or laptop), smartphone, or tablet, for example. In some examples, the media device 303 may enable content provided on the device 305 to be displayed on the device 301. In a specific example, the device 305 may be executing an application that renders content to be displayed, and the media device 303 routes that content to the device 301 such that the device 301 can display that content on the display screen 102

Figure 4:
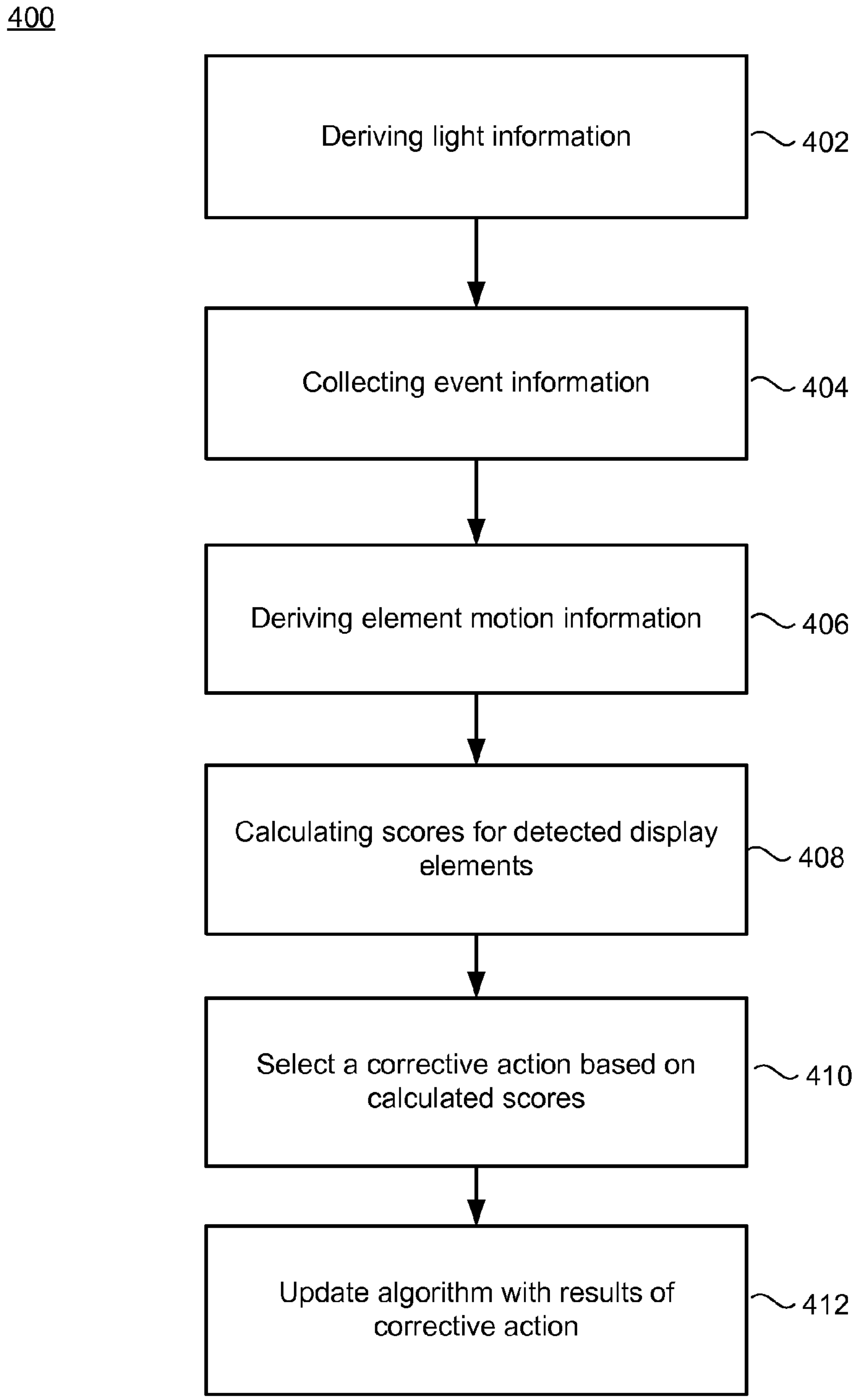
FIG. 4 illustrates a flowchart depicting example operations of the image degradation prevention module of FIG. 1 according to an aspect.

FIG. 4 illustrates a flowchart 400 depicting example operations of the image degradation prevention module 104 described with reference to FIGS. 1-3 according to an aspect. Although FIG. 4 is illustrated as a sequential, ordered listing of operations, it will be appreciated that some or all of the operations may occur in a different order, or in parallel, or iteratively, or may overlap in time.

Light information may be derived (402). For example, the screen region monitor 126 may be configured to derive the light information 110 using any type of integrated hardware analysis on the various pixels of the regions 106 of the display screen 102. For example, the screen region monitor 126 may track changes in light intensities (and wavelength) within the regions 106 over time. As such, the light information 110 may indicate a rate of change in the light intensity of pixels within each region 106 over time, as well as the rate of change in wavelengths applied to the pixels within each region 106 over time. In some examples, the screen region monitor 126 may be configured to detect the rate of change in the light intensity (and wavelengths) of pixels over time by recursively subdividing the display screen 102 into a number of distinct regions 106, and determining a change of luminance of the pixels within each region 106 over time.

Event information may be collected (404). If allowed or permitted by the user, the image degradation prevention module 104 (e.g., the event collector 130) may obtain the event information 114 in order to supplement the element motion information 112 and the light information 110. The event information 114 may relate to the display of the display elements 108 based on user events that draws or re-draws the display elements 108 on the display screen 102. For example, the event information 114 may include information regarding the display of the display elements 108 that have been rendered by Open Graphics Library (open GL) or other display technologies based on individual user requests. In some examples, the event information 114 may include information similar to the element motion information 112 and/or the light information 110. In some examples, the event information 114 may include the size and/or shape of the display elements 108, which positions the display elements 108 are drawn, and/or pixel luminance information for the pixels within the respective regions 106 of the display screen 102.

Element motion information may be derived (406). For example, the element movement detector 128 configured to derive the element motion information 112. For example, the element movement detector 128 may be configured to detect the display elements 108 rendered within the regions 106 of the display screen 102 using any type of object detection technique on the display elements 108. In some examples, the element movement detector 128 may detect the shapes and positions of the display elements 108 based on corner-point detection. Then, the element movement detector 128 may track the movements of the detected display elements 108 over time to create the element motion information 112. The element motion information 112 may indicate a rate of movement of the display element 108 within the display screen 102 over time.

Scores for detected display elements may be calculated (408). In some example, the score calculator 134 may be configured to compute the score 118 for each of the display elements 108 based on the information 110, 112, and/or 114. Each score 118 may indicate a degree of causing image degradation within one or more of the regions 106 (e.g., the higher the score, the more likely the potential for causing screen burn-in or image persistence). In other words, the score 118 may indicate a likelihood of causing image degradation by a corresponding display element 108. In some examples, the score calculator 134 may compute the score 118 based on the display element's rate of change in the light intensity of pixels over time from the light information 110, the display element's rate of movement from the element motion information 112, and/or the display element's event information 114. In some examples, the score calculator 134 may compute the score 118 using a weighted scoring algorithm that applies weights to the metrics from the information 110, 112, and 114.

A corrective action may be selected based on the calculated scores (410). For example, the action decider 136 may be configured to select the corrective action 124 among a plurality of corrective action based on the computed scores 118. The action decider 136 may dynamically select the corrective action 124 among the plurality of corrective actions such that the selected corrective action 124 may be relatively more effective in reducing image degradation than other non-selected corrective actions. In some examples, the scores 118 may provide a basis for the corrective action selection. Also, in some examples, in conjunction with the scores 118, the action decider 136 may select the corrective action 124 for the one or more at-risk display elements 108 by examining previous corrective action information 116 indicating which previously applied corrective actions were effective or ineffective for reducing potential image degradation. Then, the decision engine 132 may apply the selected corrective action 124. As indicated above, the determined corrective action 124 may include moving the display element 108 from a first displayed position to a second displayed position, or adjusting the luminance of one or more pixels within the display elements 108.

The algorithm may be updated with results of corrective action (412). For example, the updater 138 may adjust the decision selection criteria of the decision engine 132 based on the previous corrective action information 116 such that a different corrective action is selected that is considered relatively more effective. In some examples, the updater 138 may adjust how the impact of image degradation is determined. In some examples, the updater 138 may adjust the scoring algorithm (e.g., adjusting the weights) implemented by the score calculator 134 based on the previous corrective action information 116. As such, the dynamic evaluation and selection of corrective actions 124 may improve over time as the decision engine 132 learns more about what corrective actions 124 were effective or ineffective.

Figure 5:
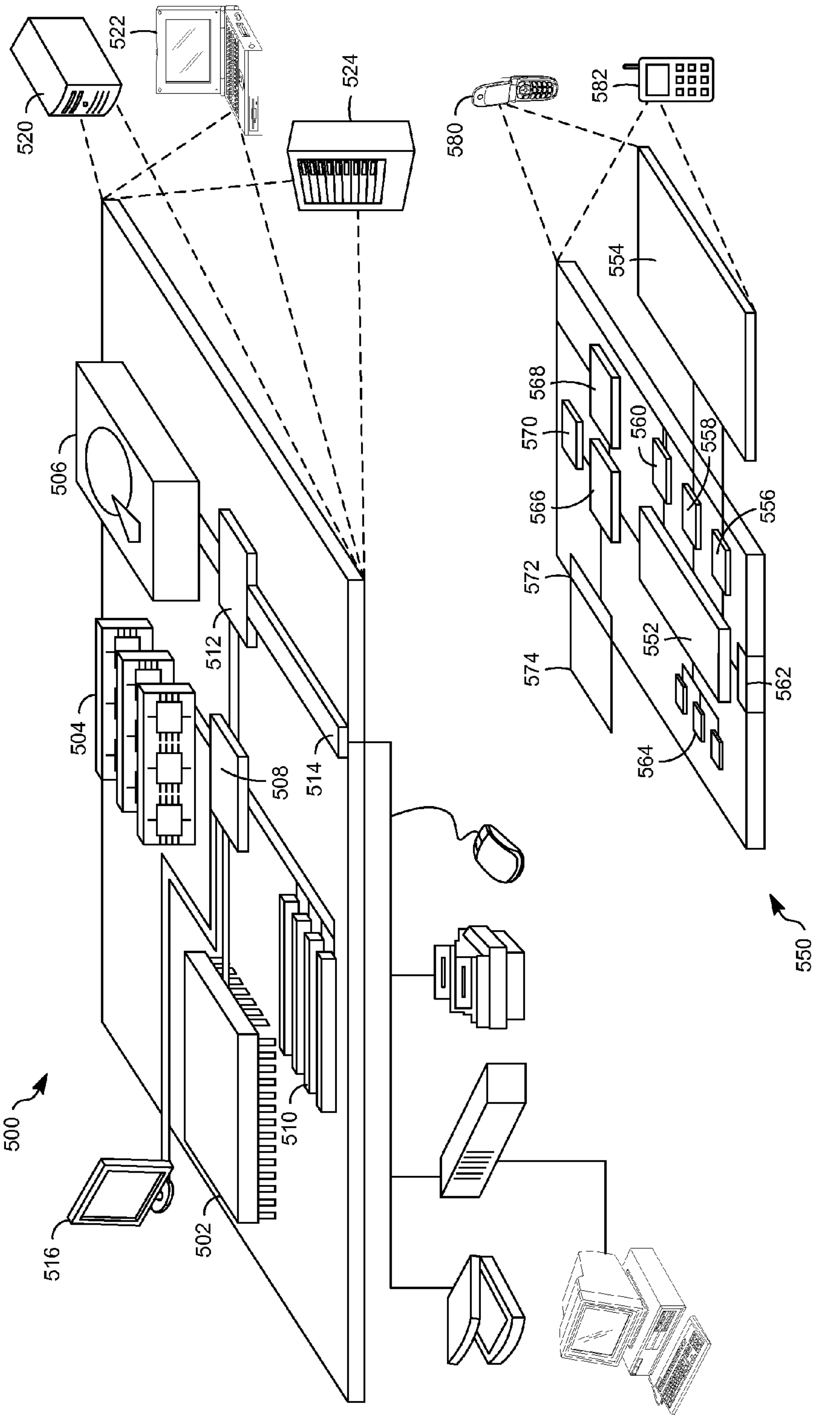
FIG. 5 is a block diagram showing example or representative devices and associated elements that may be used to implement the image degradation prevention module, the devices, and associated methods of FIGS. 1-4.

FIG. 5 is a block diagram showing example or representative devices and associated elements that may be used to implement the image degradation prevention module 104, the devices and methods of FIGS. 1-4. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI (e.g., the display screen 102) on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., cathode ray tube (CRT), plasma, liquid crystal display (LCD), light-emitting diode (LED), or organic light-emitting diode (OLED) technologies) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "modifying" or "receiving" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An image degradation prevention system for reducing image degradation, the image degradation prevention system comprising:

a screen region monitor configured to cause at least one processor to derive light information for each of a plurality of regions of a display screen, the light information including light intensity information indicating a rate of change in light intensity of pixels within each region;

an element movement detector configured to cause the at least one processor to derive element motion information for a plurality of display elements displayed in the plurality of regions, the element motion information indicating a rate of movement for each display element within the display screen; and a decision engine configured to cause the at least one processor to determine an impact of potential image degradation caused by each display element based on an evaluation of the light information and the element motion information, the decision engine configured to cause the at least one processor to select an at-risk display element as a candidate for causing image degradation based on the determined impact satisfying a threshold condition, the decision engine configured to cause the at least one processor to select a first corrective action for the at-risk display element, the decision engine configured to cause the at least one processor to select a second corrective action for the at-risk display element if the impact of potential image degradation has increased after the first corrective action has been applied, the second corrective action being different than the first corrective action.

2. The image degradation prevention system of claim 1, wherein the screen region monitor is configured to cause the at least one processor to detect the rate of change in the light intensity of pixels by recursively subdividing the display screen into the plurality of regions and determining a change of luminance of the pixels within each region over time.

3. The image degradation prevention system of claim 1, wherein the element movement detector is configured to cause the at least one processor to detect the display elements within the regions, and track the movement of the detected display elements over time.

4. The image degradation prevention system of claim 1, further comprising:

an event collector configured to cause the at least one processor to derive event information for draw or redraw events related to the display elements rendered from at least one application, the decision engine configured to cause the at least one processor to select the first corrective action based on the event information, the light information, and the element motion information.

5. The image degradation prevention system of claim 1, wherein the decision engine includes:

a score calculator configured to cause the at least one processor to calculate a score for each display element based on an evaluation of the light information and the element motion information, the score representing the impact of potential image degradation and a likelihood of a respective display element causing image degradation; and an action decider configured to cause the at least one processor to select the at-risk display element as a candidate for causing image degradation based on the calculated score satisfying the threshold condition.

6. The image degradation prevention system of claim 5, wherein the score calculator is configured to cause the at least one processor to calculate the score for each display element according to a scoring algorithm that includes weights applied to the rate of change in the light intensity of pixels for one or more regions that displays a respective display element and the rate of movement for each display element within the display screen.

7. The image degradation prevention system of claim 1, wherein the decision engine includes an updater configured to cause the at least one processor to update previous corrective action information with the first corrective action and result information indicating whether the first corrective action was effective or ineffective for reducing image degradation.

8. A non-transitory computer-readable medium storing executable instructions that when executed by at least one processor are configured to:

derive light information for each of a plurality of regions of a display screen;

derive element motion information for a plurality of display elements displayed in the plurality of regions;

determine an impact of potential image degradation caused by each display element based on an evaluation of the light information and the element motion information;

select a first corrective action for an at-risk display element based on the impact of potential image degradation caused by each display element;

apply the first corrective action to the at-risk display element;

update the evaluation of the light information and the element motion information based on a result of the first corrective action;

determine whether the impact of potential image degradation caused by the at-risk display element has changed after the first corrective action has been applied; and select a second correction action for the at-risk display element when the impact of potential image degradation has increased, the second corrective action being different than the first corrective action.

9. The non-transitory computer-readable medium of claim 8, wherein the executable instructions to derive light information include executable instructions to detect the rate of change in the light intensity of pixels by recursively subdividing the display screen into the plurality of regions and determine a change of luminance of the pixels within each region over time.

10. The non-transitory computer-readable medium of claim 8, wherein the executable instructions to derive light information include executable instructions to derive light wavelength information indicating transitions in wavelengths over time.

11. The non-transitory computer-readable medium of claim 8, further comprising executable instructions to:

derive event information for at least one user event that caused a rendering of the at-risk display element; and select the first corrective action based on the event information, the light information, and the element motion information.

12. The non-transitory computer-readable medium of claim 8, wherein the executable instructions to determine the impact of potential image degradation caused by each display element include executable instructions to calculate a score for each display element based on a scoring algorithm that applies weights to metrics of the light information and the element motion information.

13. The non-transitory computer-readable medium of claim 8, wherein the first corrective action indicates to change a luminance of the at-risk display element, and the second corrective action indicates to change a position of the at-risk display element.

14. A method for reducing image degradation, the method being performed by at least one processor, the method comprising:

determining an at-risk display element for causing image degradation on a display screen based on an evaluation of light information indicating a rate of change of light intensity of pixels within each region of a plurality of regions, element motion information indicating a rate of movement for each of a plurality of display elements displayed within a display screen, and event information indicating a draw or re-draw event for one or more of the plurality of display elements;

selecting a first corrective action for the at-risk display element according to decision-making criteria;

applying the first corrective action to reduce potential image degradation caused by the at-risk display element;

updating the decision-making criteria with a result of the first corrective action;

selecting a second corrective action for the at-risk display element according to the updated decision-making criteria, the second corrective action being different than the first corrective action; and applying the second corrective action to reduce the potential image degradation caused by the at-risk display element.

15. The method of claim 14, wherein the selecting the first corrective action includes:

calculating a score indicating an impact of causing potential image degradation by the at-risk display element based on the light information, the motion element information, and the event information; and selecting the first corrective action based on the score satisfying a threshold condition.

16. The method of claim 14, wherein the updating the decision-making criteria includes changing the scoring algorithm based on the result of the first corrective action.

17. The method of claim 14, wherein the first corrective action is selected based on an evaluation of the light information, the motion element information, and the event information within the decision-making criteria.

18. The method of claim 14, wherein the first corrective action indicates to change a luminance of the at-risk display element, and the second corrective action indicates to change a position of the at-risk display element.

19. The method of claim 14, further comprising:

deriving the event information by collecting information regarding a display of the at-risk display element that has been rendered by Open Graphics Library (open GL) or other display technologies in response to a user request.

20. The method of claim 14, wherein the light information and the element motion information are derived from a hardware analysis on pixels of the display screen, and the event information is derived from a software analysis on the device rendering the display elements for display.

* * * * *